(12) United States Patent
Edlabadkar et al.

(10) Patent No.: US 11,897,367 B2
(45) Date of Patent: Feb. 13, 2024

(54) DRIVE SYSTEM

(71) Applicant: Transportation IP Holdings, LLC, Norwalk, CT (US)

(72) Inventors: Nikhil Edlabadkar, Bangalore (IN); Ajith Kuttannair Kumar, Erie, PA (US); Joe Ferko, Erie, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 32 days.

(21) Appl. No.: 17/458,166

(22) Filed: Aug. 26, 2021

(65) Prior Publication Data

US 2022/0080834 A1 Mar. 17, 2022

Related U.S. Application Data

(60) Provisional application No. 63/077,267, filed on Sep. 11, 2020.

(51) Int. Cl.
*B60L 7/22* (2006.01)
*B60L 7/06* (2006.01)
(Continued)

(52) U.S. Cl.
CPC .................. *B60L 7/22* (2013.01); *B60L 7/06* (2013.01); *B60L 7/14* (2013.01); *B60L 7/08* (2013.01); *B60L 7/18* (2013.01)

(58) Field of Classification Search
CPC ...... B60L 7/22; B60L 7/06; B60L 7/14; B60L 7/08; B60L 7/18

(Continued)

(56) References Cited

U.S. PATENT DOCUMENTS

| 5,436,540 A | * | 7/1995 | Kumar | H03K 17/08144 363/124 |
| 7,325,498 B2 | | 2/2008 | Kumar et al. | |

(Continued)

FOREIGN PATENT DOCUMENTS

| CN | 102013872 A | 4/2011 |
| CN | 109155582 A | 1/2019 |

(Continued)

OTHER PUBLICATIONS

CN 103770659 A "Hybrid Energy Off Highway Vehicle Propulsion Circuit" Date Published: May 7, 2014 Inventor: Kumar, A K (Year: 2014).*

(Continued)

*Primary Examiner* — Jorge L Carrasquillo
(74) *Attorney, Agent, or Firm* — The Small Patent Law Group LLC; Christopher R. Carroll

(57) ABSTRACT

A system comprising resistive circuit legs coupled with and disposed between (a) a converter that converts electric current for a motor of a powered system and (b) a source of electric current for powering the motor, each of the circuit legs including a braking resistor coupled with the converter, a contactor coupled with the braking resistor such that the braking resistor is between the converter and the contactor, and a semiconductor switch coupled with the contactor such that the contactor is between the semiconductor switch and the braking resistor, where, during a regenerative braking mode of operation of the powered system, the regenerated energy from the motor is conducted to the braking resistor and dissipated as heat.

14 Claims, 10 Drawing Sheets

(51) Int. Cl.
  *B60L 7/14* (2006.01)
  *B60L 7/08* (2006.01)
  *B60L 7/18* (2006.01)

(58) Field of Classification Search
  USPC .................................. 318/362, 370, 375, 380
  See application file for complete search history.

(56) References Cited

U.S. PATENT DOCUMENTS

| | | | |
|---|---|---|---|
| 7,633,271 B2* | 12/2009 | Schulte | ................... B60L 50/40 320/167 |
| 9,008,879 B2 | 4/2015 | Kumar et al. | |
| 9,731,607 B1* | 8/2017 | Ratadiya | ................... B60L 7/08 |
| 2006/0076171 A1 | 4/2006 | Donnelly et al. | |
| 2007/0144800 A1 | 6/2007 | Stone | |
| 2008/0150459 A1* | 6/2008 | Alexander | ................ H02P 3/22 318/376 |
| 2011/0057588 A1 | 3/2011 | Rineh et al. | |
| 2011/0100735 A1 | 5/2011 | Flett | |

FOREIGN PATENT DOCUMENTS

| | | |
|---|---|---|
| CN | 110406527 A | 11/2019 |
| JP | 2001-136602 A | 5/2001 |
| JP | 2014-217131 A | 11/2014 |
| WO | 2019100945 A1 | 5/2019 |

OTHER PUBLICATIONS

Office Action dated Jun. 22, 2022 for corresponding Eurasian application No. 202192212 (3 Pages).
Extended European Search Report dated Jan. 20, 2022 for corresponding EP Application No. 21195333.6 (8 pages).
First Examination Report dated Apr. 19, 2022 for corresponding Indian Patent Application No. 202114039467 (5 bages).
Search Report dated Jan. 22, 2022 for corresponding Eurasian application No. 202192212 (3 Pages).
English translation of Search Report dated Jan. 22, 2022 for corresponding Eurasian application No. 202192212 (2 Pages).
First Examination Report dated Jun. 7, 2022 for corresponding AU Patent Application No. 2021229144 (3 pages).
Examination Report No. 1 for corresponding AU Application No. 2022283719 dated Aug. 4, 2023 (3 pages).
Office Action dated Jul. 24, 2023 for corresponding Chinese Application No. 202111071047.3 (15 pages).
Office Action for corresponding Eurasian Application No. 202390389 dated Jul. 19, 2023 (5 pages).
Office Action for corresponding Russian Application No. 202390389 dated Sep. 14, 2023 (4 pages).
Office Action dated Nov. 29, 2023 for corresponding Japanese Application No. 2021140332 (21 pages).

* cited by examiner

DRIVE SYSTEM

CROSS-REFERENCE TO RELATED APPLICATIONS

This application claims priority to U.S. Provisional Patent Application No. 63/077,267, which was filed on 11 Sep. 2020, and the entire disclosure of which is incorporated herein.

BACKGROUND

Technical Field

The subject matter described herein relates to a drive system that controls braking.

Discussion of Art

Regenerative braking and rheostatic braking in powered systems are useful for reversing the current in electromagnetic devices, such as motors for slowing down powered systems such as vehicles. When powered systems enter such a braking mode, however, the braking process occurs in discrete steps due to the use of contactor switches that open and close to control the conduction of current. This can lead to arcing and associated wear and tear on various circuit components of the powered system, such as contactor switches and/or braking resistors. The wear and tear on these components may require increased maintenance along with replacement costs associated with worn out components.

BRIEF DESCRIPTION

In one or more embodiments, a drive system is provided that can include resistive circuit legs coupled with and disposed between a converter that converts electric current for a motor of a powered system and a source of electric current for powering the motor. Each of the circuit legs can include a braking resistor coupled with the converter. Each of the circuit legs can include a contactor coupled with the braking resistor such that the braking resistor is between the converter and the contactor. Each of the circuit legs can include a semiconductor switch coupled with the contactor such that the contactor is between the semiconductor switch and the braking resistor. During a regenerative braking mode of operation of the powered system, the regenerated energy from the motor can be conducted to the braking resistor and dissipated as heat.

In another aspect, a drive system is provided that can include a braking resistor coupled with a converter that converts electric current for a motor of a powered system and several circuit legs coupled with the braking resistor in parallel to each other. Each of the circuit legs can include a contactor and a semiconductor switch coupled with the contactor such that the contactor is between the semiconductor switch and the braking resistor. During a regenerative braking mode of operation of the powered system, the regenerated energy from the motor can be conducted to the braking resistor and dissipated as heat, based on which contactors or semiconductor switches are closed.

In one or more embodiments, a drive system is provided that can include inductors. Each of the inductors can be configured to be disposed onboard a powered system and selectively coupled with source of first electric current and a converter that converts the electric current for a motor of a powered system. Additionally, each of the inductors can be coupled with a node located between a drain of a semiconductor switch and an anode of a diode or a controlled semiconductor switch. Each of the anodes can be coupled with a converter, contactors connected in parallel with each other between the source of the first electric current and the converter. Further, each of the anodes can be coupled with braking resistors connected in parallel with each other, each of the braking resistors connected in series with a different contactor between the contactor and the converter. Furthermore, each of the anodes can be coupled with a semiconductor switch coupled with the contactor such that the contactor is between the semiconductor switch and the braking resistors. During a regenerative braking mode, rheostatic braking mode, or a combination of both modes of operation of the powered system, the regenerated electric current from the motor can be conducted to the braking resistor and dissipated as heat, based on which contactors or first semiconductor switches are closed.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
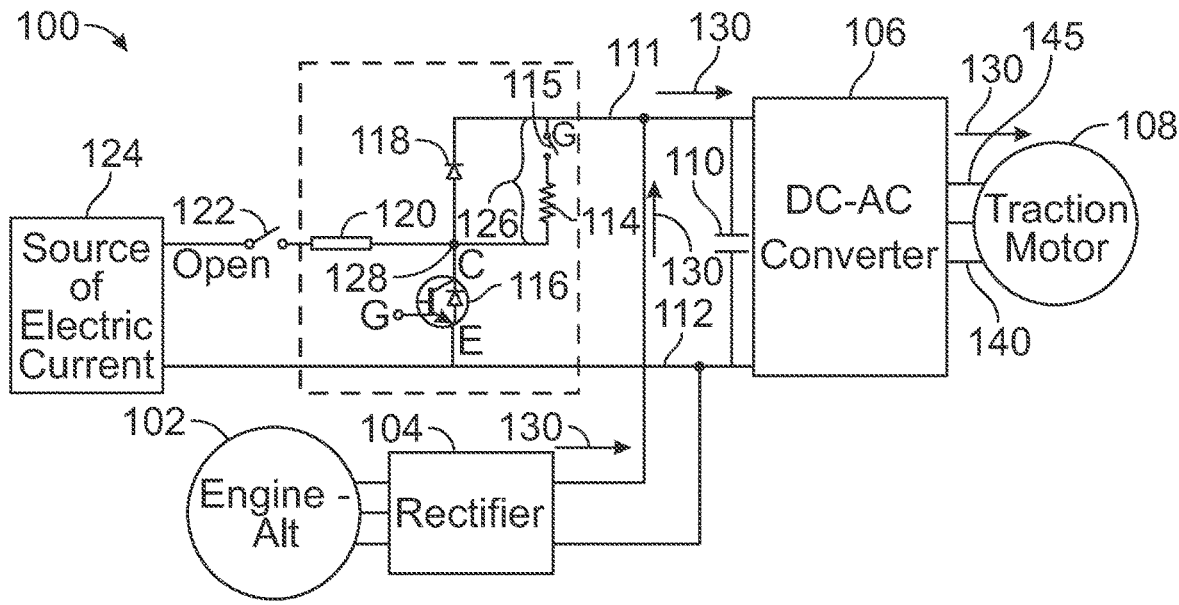
FIG. 1 illustrates a schematic view of a drive system in an engine propulsion mode of operation.

Embodiments of the subject matter described herein relate to a drive system with braking control. By using a semiconductor switch, optionally in conjunction with a contactor and a braking resistor, a controlled retard during braking of a powered system may be accomplished. For example, the pulsing or opening and closing of the semiconductor switch can allow smaller, more discrete amounts of current through the braking resistor. If the current is too much for one semiconductor switch to handle, another semiconductor switch may handle the current for least some of the time. For example, one semiconductor switch may handle the current one-third of the time, another semiconductor switch handles the current another third of the time, and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing as well as wear and tear on the discrete components may be reduced or eliminated. This may provide a system with relatively fewer moving parts so that complexity of manufacturing and expense may be reduced.

The drive system may include a controller. In one embodiment, a suitable semiconductor switch may be an insulated gate bipolar transistor (IGBT). A suitable contactor may be an electrically-controlled switch used for switching an electrical power circuit. The contactor may be controlled by a circuit which has a lower power level than the switched circuit, such as a 74-volt coil electromagnet controlling a 1000-volt motor switch. In one embodiment, the contactor may be a relay. In another embodiment, the contactor may include one or more features to control and suppress any arc produced when interrupting an electrical current. A suitable braking resistor may include a bank of resistors that may dissipate electrical current as heat. Other suitable resistors may include devices that receive and/or manage the incoming electrical current. For example, any electrical circuit may have an inherent electrical resistance and, to at least some extent, may be used as a resistive circuit. In one embodiment, the resistive circuit may include one or more energy storage devices. In addition to having internal electrical resistance, energy storage devices may act as a repository for the electric current. In another embodiment, the resistive circuit may accept, and dispose of, the electric current through work performed (as an alternative or in addition to heat generation). For example, a resistive circuit may include an air compressor such that when the circuit is energized the compressor operates an air pump. In another embodiment, the resistive circuit is off-board the powered system but electrically coupled to the powered system via, for example, a catenary or a third rail. That off-board resistive circuit may rely on the inherent resistance of the circuit and/or may include devices that provide a load and/or may include energy storage devices. In non-limiting examples, the powered system may be a vehicle, a wind turbine, or other system containing a motor. In other non-limiting examples, the motor may be used for propulsion, such as a traction motor, or for other purposes, such as rotating blades in a fan, wind turbine, or the like.

Figure 2:
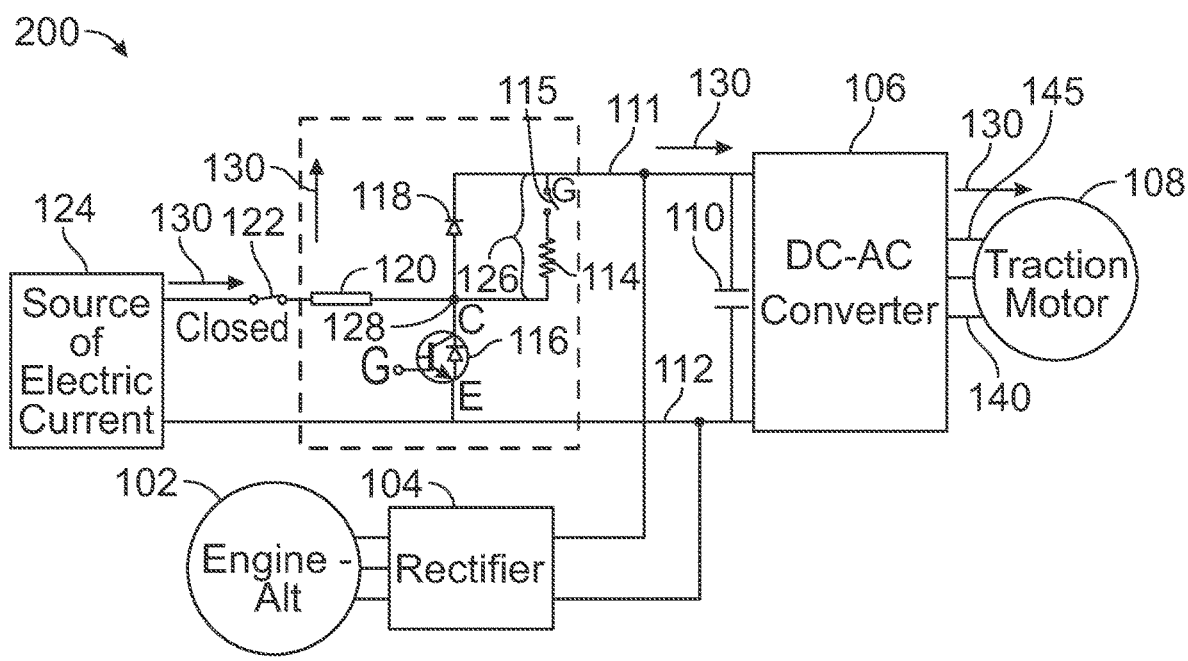
FIG. 2 illustrates a schematic view of a drive system in a boost mode of operation.
Figure 3:
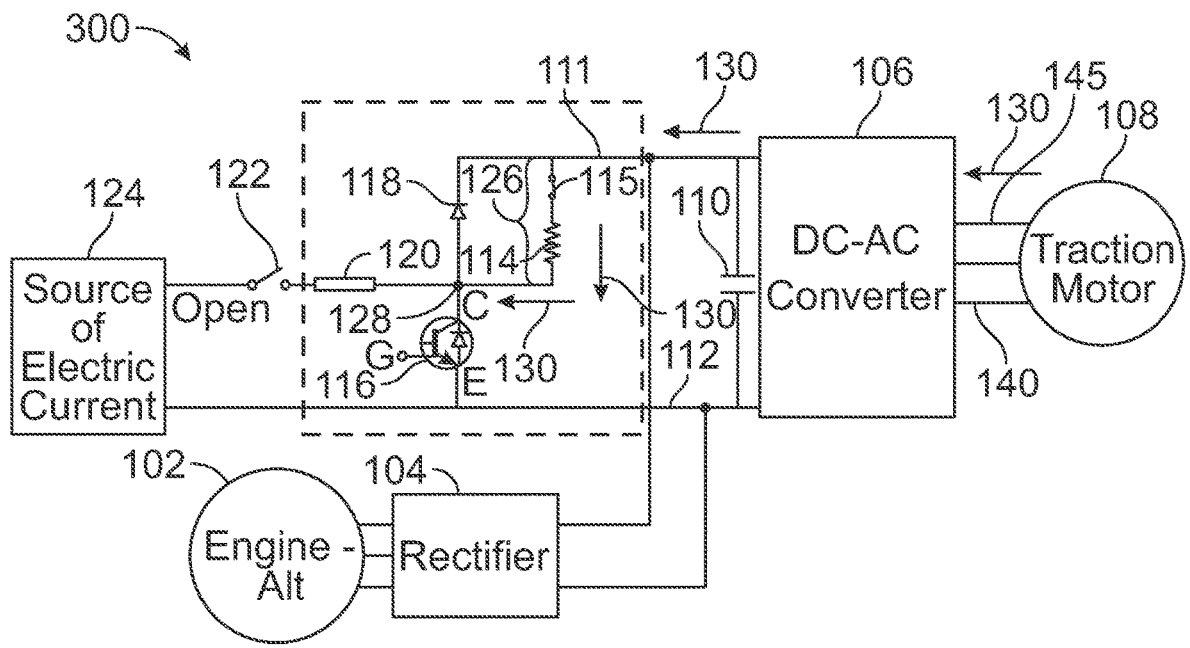
FIG. 3 illustrates a schematic view of a drive system in a dynamic braking mode of operation.

FIGS. 1, 2, and 3 illustrate operation of a first embodiment of a drive system in an engine propulsion mode, a boost propulsion mode, and a dynamic braking mode, respectively. Included in the illustrated schematic are two sources of electric current, an on-board source and an off-board source. Alternatively, the drive system may have another on-board source, such as a battery instead of an off-board source. The off-board source of electric current 124 can be a power source, such as an electrified rail or a catenary. The on-board source can be an engine-alternator set 102, an energy storage device, or battery. The off-board source of electric current is connected to a positive bus 111 and a negative bus 112. The positive bus connects the source of electric current with a first contactor switch 122 and an inductor 120. The first switch is located between the source of electric current and the inductor.

The inductor is connected to the collector of a semiconductor switch 116 and the anode of a diode 118. The cathode of the diode is connected in parallel with a circuit leg 126 that includes a second contactor switch 115 and a braking resistor 114. A corresponding node 128 is disposed between the contactor switch and the semiconductor switch. In the circuit leg, the contactor and the braking resistor are connected in series with each other. The circuit leg is connected in parallel with the diode. The cathode of the diode and the circuit leg having the braking resistor and the contactor are coupled with a direct current to alternating current (DC-AC) converter 106 by the positive bus. The DC-AC converter is connected to a motor 108 by another positive bus 145 and another negative bus 140. A capacitor 110 is connected in parallel with the diode, the circuit leg, and the DC-AC converter. The off-board source of electric current is connected with an emitter of the semiconductor switch by the negative bus. The negative bus is connected with the capacitor and with the DC-AC converter. A rectifier 104 is connected with the DC-AC converter by another positive bus and another negative bus. In the illustrated embodiment, the motor is a traction motor. Optionally, the motor may not be a traction motor that generates torque to propel a vehicle. For example, the motor can power a pump or perform work other than propulsion.

In the engine propulsion mode of operation illustrated by FIG. 1, the first contactor disposed between the source of electric current and the inductor is open, which does not allow any current to be conducted from the source of electric current. The engine-alternator set generates power to the rectifier to provide power for the motor. A current flow 130 is conducted from the engine-alternator set to the motor. The rectifier can convert the AC voltage from the engine-alternator set to DC, providing current for charging the capacitor. The current is conducted to the DC-AC converter. The DC-AC converter can convert incoming DC to AC to provide current for the motor. The motor uses the AC to propel a powered system.

FIG. 2 illustrates the drive system in a boost mode of operation. In boost mode, the first contactor switch disposed between the source of electric current and the inductor is closed, allowing a current flow from the source of electric current along the positive bus. The source of electric current generates power to the inductor, where the energy may be stored. The current can be conducted through the diode to provide power for the motor. Connected to the source of electric current via the negative bus, the capacitor may be charged, and the motor may receive current.

FIG. 3 illustrates the drive system in a dynamic braking mode of operation. The dynamic braking mode may be a regenerative braking mode, a rheostatic braking mode, or a combination of both modes. In the regenerative or rheostatic braking mode, or a combination of both modes, the first contactor switch disposed between the source of electric current and the inductor is open and does not allow current to be conducted from the off-board power source to the motor. However, the second contactor switch disposed in the circuit leg is closed and does allow current to be conducted from the motor through the braking resistor and the semiconductor switch. The regenerated energy from the motor is conducted to the braking resistor and dissipated as heat. A current flow for the circuit is illustrated, conducting from the motor along the positive bus of the drive system 300 through the semiconductor switch. Then, the current is conducted along the negative bus to the capacitor, the DC-AC Converter, and back to the motor. In this embodiment, the capacitor is discharged, and the motor provides the voltage in this embodiment. The semiconductor switch can modulate or pulse between opening and closing in a rapid manner. The fast pulsing of the semiconductor switch will allow braking to be a smooth and controlled retard. For example, with the second contactor disposed in the circuit leg closed, the pulsing or opening and closing of the semiconductor switch can allow smaller more discrete amounts of current through the braking resistor. If the current is too much for one semiconductor switch to handle, another semiconductor switch may be configured to handle at least some of the current. For example, one semiconductor switch may handle the current one-third of the time, another semiconductor switch handles the current another third of the time, and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced.

FIGS. 4 through 7 illustrate operation of an embodiment of a drive system in an engine propulsion mode, a boost propulsion mode, and a dynamic braking mode, respectively. Included in the illustrated schematic are two sources of electric current, an on-board source 402 and an off-board source 424 of electric current. Alternatively, the drive system may have another on-board source, such as a battery instead of an off-board source of electric current. The off-board source of electric current can be a power source, such as an electrified rail or a catenary. The on-board source 402 can be an engine-alternator set, an energy storage device (e.g., a battery), etc. The source(s) of electric current is or are connected to a positive bus 411 and a negative bus 412. The positive bus connects the source(s) of electric current with a first contactor switch 422 and an inductor 420. The first contactor switch is located between the source of electric current and the inductor.

The inductor is connected to a collector of a first semiconductor switch 416 and an emitter of a second semiconductor switch 418. The collector of the second semiconductor switch is connected in parallel with a circuit leg 426 that includes a second contactor switch 415 and the braking resistor. A corresponding node 428 is disposed between the first semiconductor switch and the second semiconductor switch, and between the inductor and the circuit leg. In the circuit leg, the second contactor and the braking resistor are connected in series with each other. The circuit leg is connected in parallel with the second semiconductor switch. The collector of the second semiconductor switch and the circuit leg having the braking resistor and the contactor are coupled with a direct current to alternating current (DC-AC) converter 406 by the positive bus. The DC-AC converter is connected to a motor 408 by another positive bus 445 and another negative bus 440. A capacitor 410 is connected in parallel with the second semiconductor switch, the circuit leg, and the DC-AC converter. The off-board source of electric current is connected with the emitter of the first semiconductor switch by the negative bus. The negative bus is connected with capacitor and with the DC-AC converter. A rectifier 404 is connected with the DC-AC converter by another positive bus and another negative bus. In the illustrated embodiment, the motor is a traction motor.

Figure 4:
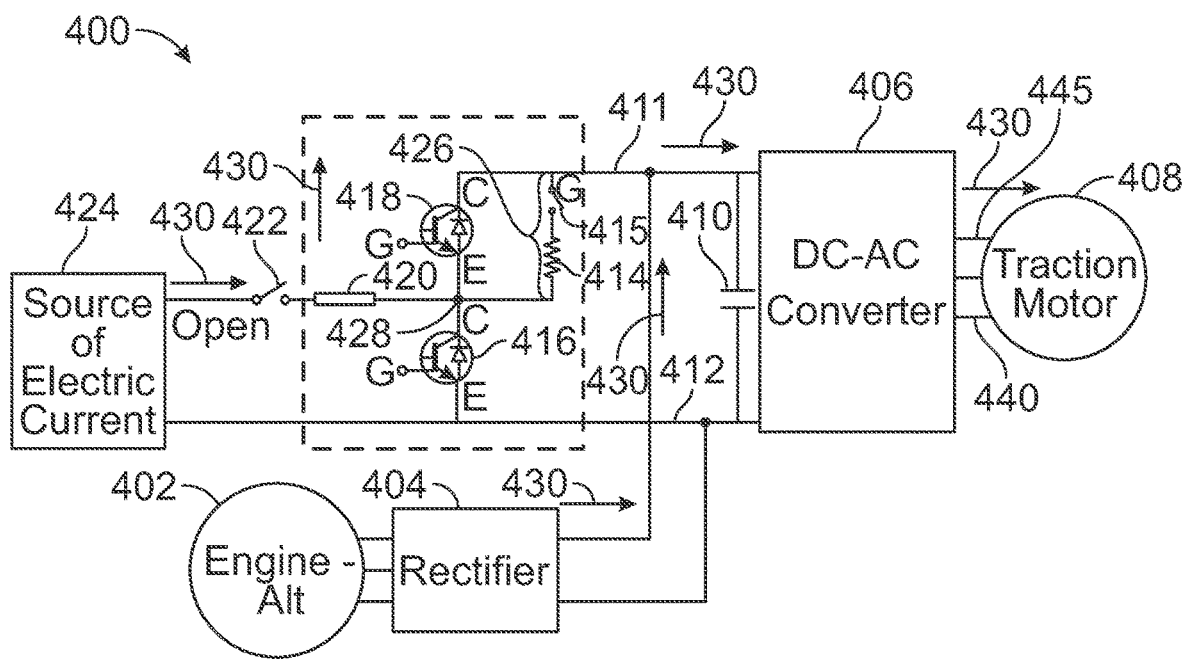
FIG. 4 illustrates a schematic view of a drive system in an engine propulsion mode of operation.

In the engine propulsion mode of operation illustrated by FIG. 4, the engine-alternator set generates power to the rectifier to provide power for the motor. The current flow 430 is conducted from the engine-alternator set to the motor. The rectifier can convert the AC voltage from the engine-alternator set to DC, providing current for charging the capacitor. The current is conducted to the DC-AC converter. The DC-AC converter can convert incoming DC to AC to provide current for the motor. The motor uses the AC to propel a powered system.

Figure 5:
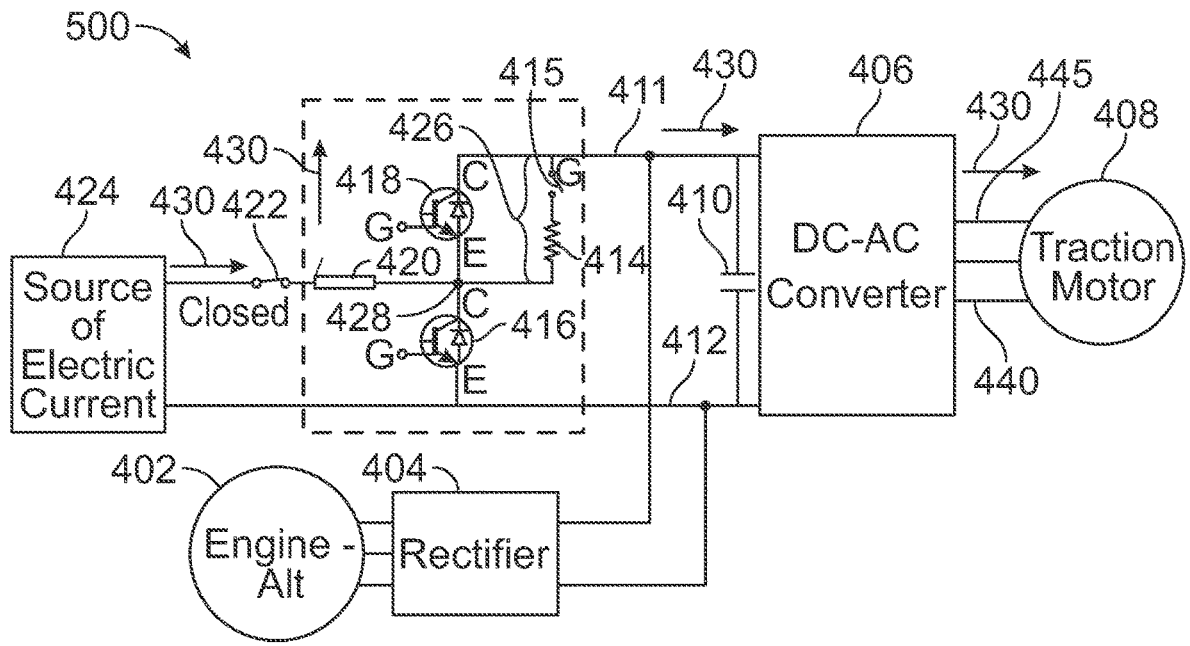
FIG. 5 illustrates a schematic view of a drive system in a boost mode of operation.

FIG. 5 illustrates the drive system in a boost mode of operation. In boost mode, the first contactor switch disposed between the off-board source of electric current and the inductor is closed, allowing a current flow from the off-board source of electric current along the positive bus. The off-board source of electric current generates power to the inductor, where the energy may be stored. The current can be conducted through the second semiconductor switch to provide power for the motor. The capacitor may be charged and the motor may receive current by also being connected to the off-board source and/or onboard source of electric current via the negative bus.

Figure 6:
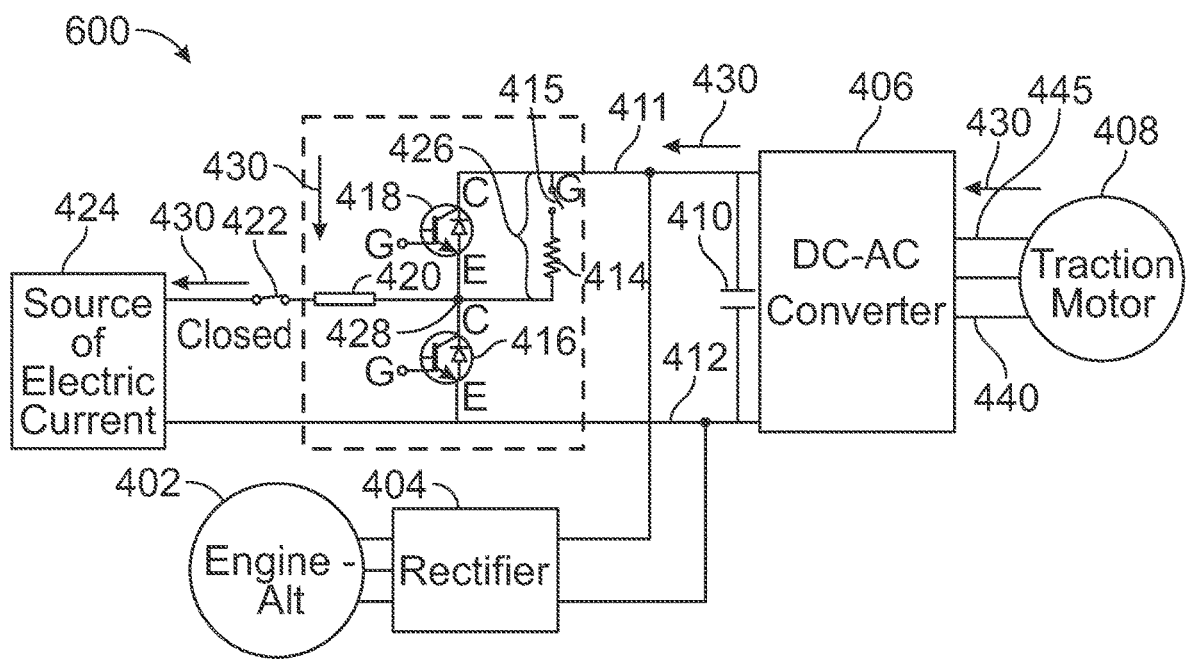
FIG. 6 illustrates a schematic view of a drive system in a dynamic braking mode of operation.

FIG. 6 illustrates the drive system in a dynamic braking mode of operation. The dynamic braking mode may be a regenerative braking mode, a rheostatic braking mode, or a combination of both modes. In the regenerative braking mode, rheostatic braking mode, or a combination of both modes, the first contactor switch disposed between the source of electric current and the inductor is closed and allows current to be conducted to the off-board source of electric current. However, the second contactor switch disposed in the circuit leg is open and does not allow current to be conducted through the braking resistor. A current flow for the circuit is illustrated, conducting from the motor (load) along a positive bus of the drive system, to the DC-AC converter along another positive bus to the capacitor, and through the semiconductor switches. The first semiconductor switch may allow current to be conducted. The second semiconductor switch can modulate between open and closed states in a rapid manner. The fast pulsing of the second semiconductor switch can allow braking to be a smooth and controlled retard. For example, with the second contactor disposed in the circuit leg closed, the pulsing or opening and closing of the second semiconductor switch can allow smaller more discrete amounts of current through the braking resistor. If the current is too much for the second semiconductor switch to handle, another semiconductor switch may be configured to handle at least some of the current. For example, the second semiconductor switch may handle the current one-third of the time while another semiconductor switch (e.g., the first semiconductor switch) handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. The current flow can continue being conducted to the off-board source of electric current and back toward the motor along the negative bus on past a connection with the emitter of the semiconductor, the capacitor, the DC-AC converter and back to the motor along another negative bus. In this embodiment, the capacitor is charged, and the motor provides the voltage in this embodiment.

Figure 7:
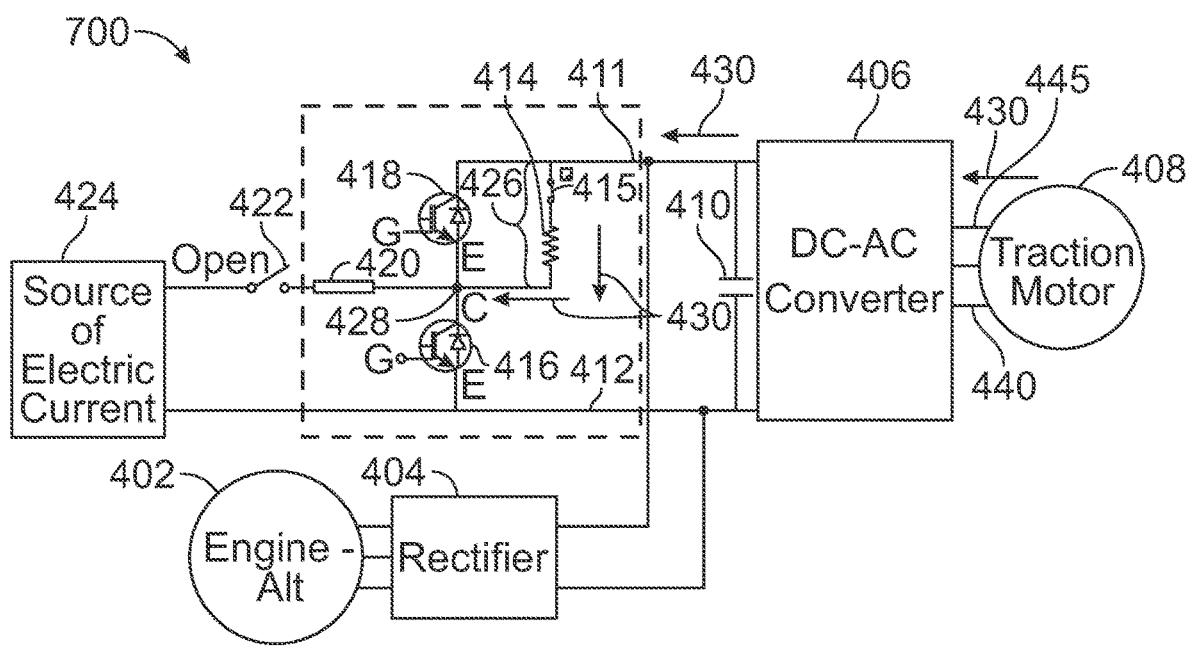
FIG. 7 illustrates a schematic view of a drive system in a dynamic braking mode of operation.

FIG. 7 illustrates the drive system in a dynamic braking mode of operation. The dynamic braking mode may be a regenerative braking mode, a rheostatic braking mode, or a combination of both modes. In the regenerative braking mode, rheostatic braking mode, or a combination of both modes, the first contactor switch disposed between the source of electric current and the inductor is open and does not allow current to be conducted to or from the off-board source of electric current. However, the second contactor switch disposed in the circuit leg is closed and does allow a current flow through the braking resistor and the first and second semiconductor switches from the motor. The second semiconductor switch may simply conduct current, while the first semiconductor can modulate open and close in a rapid manner. The regenerated energy from the motor is conducted to the braking resistor and dissipated as heat. The fast pulsing of the first semiconductor switch may allow braking to be a smooth and controlled retard. For example, with the contactor disposed in the circuit leg closed, the pulsing or opening and closing of the first semiconductor switch can allow smaller more discrete amounts of current through the braking resistor. If the current is above a determined threshold limit for the first semiconductor switch to handle, another semiconductor switch may handle at least some of the current. For example, the first semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. The current flow for the circuit can be conducted from the semiconductor switch along the negative bus of the drive system 700 through the capacitor, the DC-AC Converter, and on to the motor along another negative bus. In this embodiment, the capacitor is discharged, and the motor provides the voltage in this embodiment.

Figure 8:
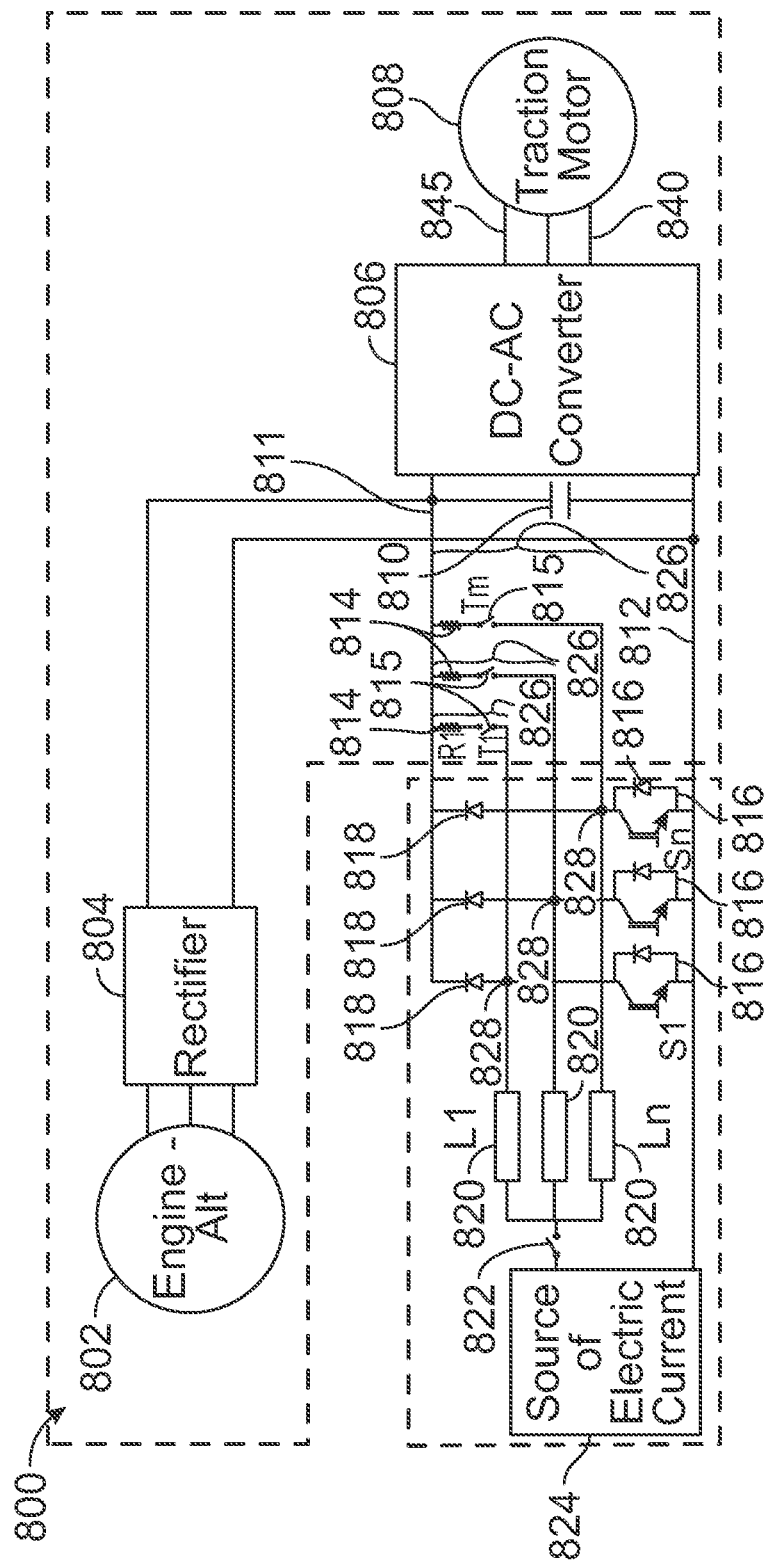
FIG. 8 illustrates a schematic view of a drive system in an engine propulsion mode of operation.

FIG. 8 illustrates operation of an embodiment of a drive system. The drive system may operate in an engine propulsion mode, a boost propulsion mode, or a dynamic braking mode, respectively. Included in the illustrated schematic are two sources of electric current, an on-board source and an off-board source. Alternatively, the drive system may have another on-board source, such as a battery instead of an off-board source. The off-board source of electric current 824 can be a power source, such as an electrified rail or a catenary. The on-board source can be an engine-alternator set 802, an energy storage device, or a battery. The off-board source of electric current can be connected to a positive bus 811 and a negative bus 812. The positive bus connects the source of electric current with a switch 822 and plural inductors 820, that are connected in parallel with each other. The switch is located between the source of electric current and the plural inductors. Each inductor of the plural inductors is connected to a collector of a semiconductor switch 816 of plural semiconductor switches and the anode of a diode 818 of plural diodes. The cathodes of the plural diodes are connected in parallel with circuit legs 826 that include plural contactor switches 815 and plural braking resistors 814. Corresponding nodes 828 are disposed between the plural contactor switches and the plural semiconductor switches. In at least some of the plural circuit legs the contactor and the braking resistor are connected in series with each other. The plural circuit legs are connected in parallel with the plural diodes. The cathodes of the plural diodes and the plural circuit legs having braking resistors and contactors can be coupled with a direct current to alternating current (DC-AC) converter 806 by the positive bus. The DC-AC converter can be connected to a motor 808 by another positive bus 845 and another negative bus 840. The capacitor 810 can be connected in parallel with the plural diodes, the plural circuit legs, and the DC-AC converter. The off-board source of electric current can be connected with the emitters of the plural semiconductor switches by the negative bus. The negative bus can be connected with the capacitor and with the DC-AC converter. In the illustrated embodiment, the motor is a traction motor.

In an engine propulsion mode of operation, the engine-alternator set generates power to the rectifier 804 to provide power for the motor. Contactors are open, so the current is conducted from the engine-alternator set to the motor. The rectifier can convert the AC voltage from the engine-alternator set to DC, providing current for charging the capacitor. The current is conducted to the DC-AC converter. The DC-AC converter can convert incoming DC to AC to provide current for the motor. The motor can use the AC current to propel the powered system.

Alternatively, the drive system may operate in a boost propulsion mode. In boost mode, the contactor switch disposed between the source of electric current and the plural inductors is closed, allowing current to be conducted from the source of electric current along the positive bus. The plural contactors disposed in the restive circuit legs are open. The source of electric current generates power to the plural inductors, where the energy may be stored. The source of electric current can be an off-board power source, such as an electrified rail or a catenary or an on-board source of electric current, such as an energy storage device or battery. The current can be conducted through the plural diodes to provide power for the motor. Connected to the source of electric current via the negative bus, the capacitor can be charged, and the motor may receive current.

Alternatively, the drive system may operate in a dynamic braking mode. The dynamic braking mode may be a regenerative braking mode, a rheostatic braking mode, or a combination of both modes. In regenerative braking mode, rheostatic braking mode, or a combination of both modes, the contactor switch disposed between the source of electric current and the plural inductors is open and does not allow current to be conducted from the off-board source of electric current. However, at least one of plural contactor switches disposed in the circuit legs is closed and does allow current to be conducted through corresponding plural braking resistors and corresponding plural semiconductor switches from the motor. The regenerated energy from the motor may be conducted to at least some of the plural braking resistors to be dissipated as heat. The plural semiconductor switches can modulate open and close in a rapid manner. The fast pulsing of the semiconductor switch will allow braking to be a smooth and controlled retard. For example, with the contactor disposed in the circuit legs closed, the pulsing or opening and closing of the semiconductor switch can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. Current is conducted from the plural semiconductor switches along the negative bus of the drive system 800 to the capacitor, the DC-AC Converter, and on to the motor. In this embodiment, the capacitor is discharged, and the motor provides the voltage in this embodiment.

Figure 9:
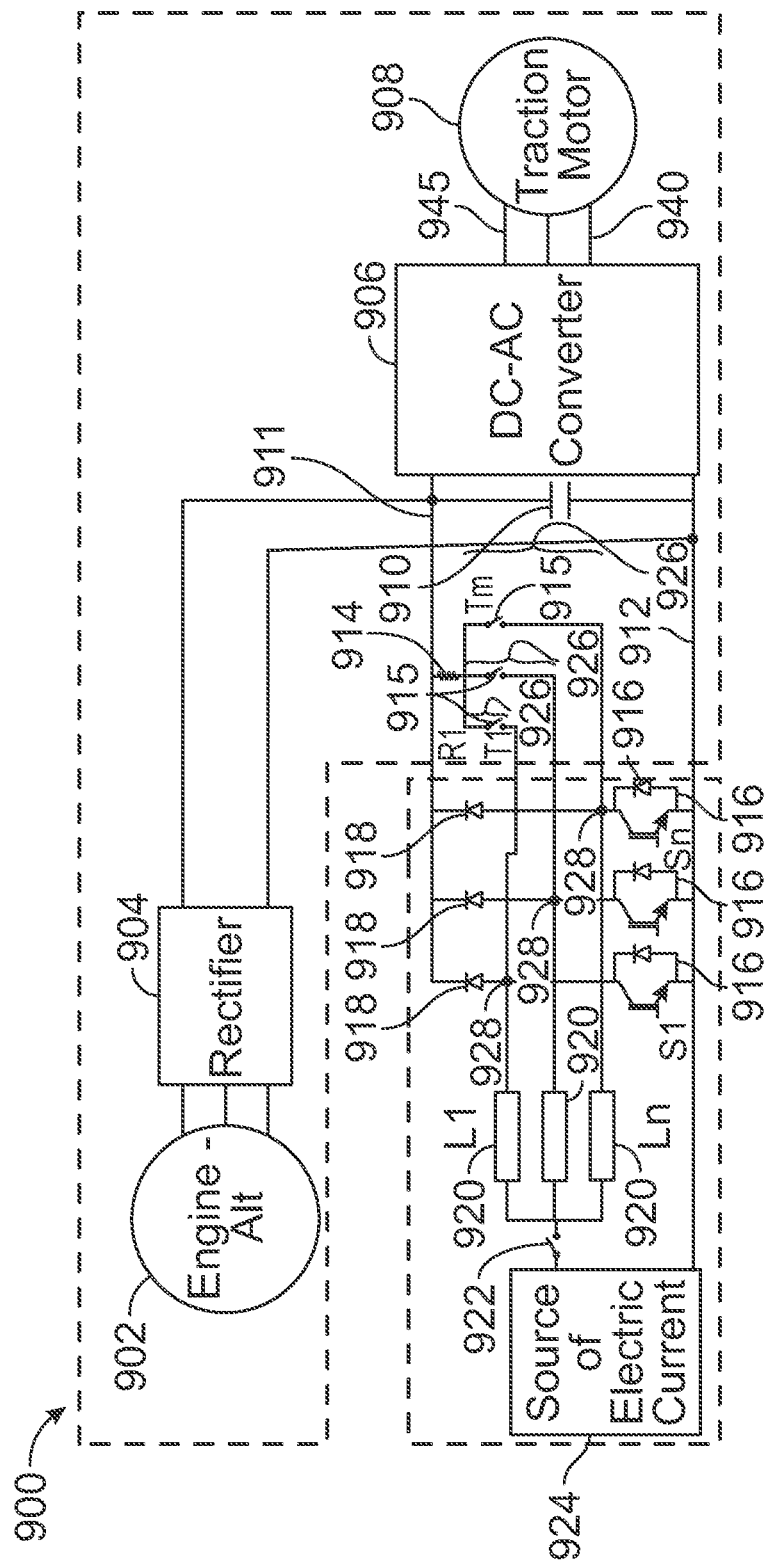
FIG. 9 illustrates a schematic view of a drive system in an engine propulsion mode of operation.

FIG. 9 illustrates operation of an embodiment of a drive system. The drive system may operate in an engine propulsion mode, a boost propulsion mode, or a dynamic braking mode, respectively. Included in the illustrated schematic are two sources of electric current, an on-board source and an off-board source. Alternatively, the drive system may have another on-board source, such as a battery instead of an off-board source. The off-board source of electric current 924 can be a power source, such as an electrified rail or a catenary. The on-board source can be an engine-alternator set 902, an energy storage device, or a battery. The off-board source of electric current can be connected to a positive bus 911 and a negative bus 912. The positive bus connects the source of electric current with a switch 922 and plural inductors 920, the plural inductors connected in parallel with each other. The switch is located between the source of electric current and the plural inductors. Each inductor of the plural inductors is connected to a collector of a semiconductor switch 916 of plural semiconductor switches and the anode of a diode 918 of plural diodes. The cathodes of the plural diodes are connected in parallel with a circuit leg 926 that includes a braking resistor 914 connected in series to other plural circuit legs connected to each in parallel. The other plural circuit legs each include a contactor 915. The circuit leg with the braking resistor and the plural contactors connected in parallel with each other is connected in parallel with the plural diodes. Corresponding nodes 928 are disposed between the plural contactor switches and the plural semiconductor switches. The cathodes of the plural diodes and the circuit leg having the braking resistor and the plural contactors connected in parallel with each other can be coupled with a direct current to alternating current (DC-AC) converter 906 by the positive bus. The DC-AC converter can be connected to a motor 908 by another positive bus 945 and another negative bus 940. The capacitor 910 can be connected in parallel with the plural diodes, the plural circuit legs, and the DC-AC converter. The off-board source of electric current can be connected with the emitters of the plural semiconductor switches by the negative bus. The negative bus can be connected with the capacitor and with the DC-AC converter. In the illustrated embodiment, the motor is a traction motor.

In an engine propulsion mode of operation, the engine-alternator set generates power to the rectifier 904 to provide power for the motor. Contactors are open, so the current is conducted from the engine-alternator set to the motor. The rectifier can convert the AC voltage from the engine-alternator set to DC, providing current for charging the capacitor. The current is conducted to the DC-AC converter. The DC-AC converter can convert incoming DC to AC to provide current for the motor.

Alternatively, the drive system may operate in a boost propulsion mode. In boost mode, the contactor switch disposed between the source of electric current and the plural inductors is closed, allowing current to be conducted from the source of electric current along the positive bus. The plural contactors disposed in the circuit legs are open. The source of electric current generates power to the plural inductors, where the energy may be stored. The source of electric current can be an off-board power source, such as an electrified rail or a catenary or an on-board source of electric current, such as an energy storage device or battery. The current can be conducted through the plural diodes to provide power for the motor. Connected to the source of electric current via the negative bus, the capacitor can be charged, and the motor may receive current.

Alternatively, the drive system may operate in a dynamic braking mode. The dynamic braking mode may be a regenerative braking mode, a rheostatic braking mode, or a combination of both modes. In regenerative braking mode, rheostatic braking mode, or a combination of both modes, the contactor switch disposed between the source of electric current and the plural inductors is open and does not allow current to be conducted from the off-board power source. The regenerated electric current from the motor is conducted to the braking resistor and dissipated as heat. However, at least one of plural contactor switches disposed in the circuit legs is closed and does allow current to be conducted through the braking resistor and corresponding plural semiconductor switches from the motor. The plural semiconductor switches can modulate open and close in a rapid manner. The fast pulsing of the semiconductor switch will allow braking to be a smooth and controlled retard. For example, with the contactor disposed in the circuit legs closed, the pulsing or opening and closing of the semiconductor switch can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. Current is conducted from the plural semiconductor switches along the negative bus of the drive system 900 to the capacitor, the DC-AC Converter, and on to the motor. In this embodiment, the capacitor is discharged, and the motor provides the voltage in this embodiment.

Figure 10:
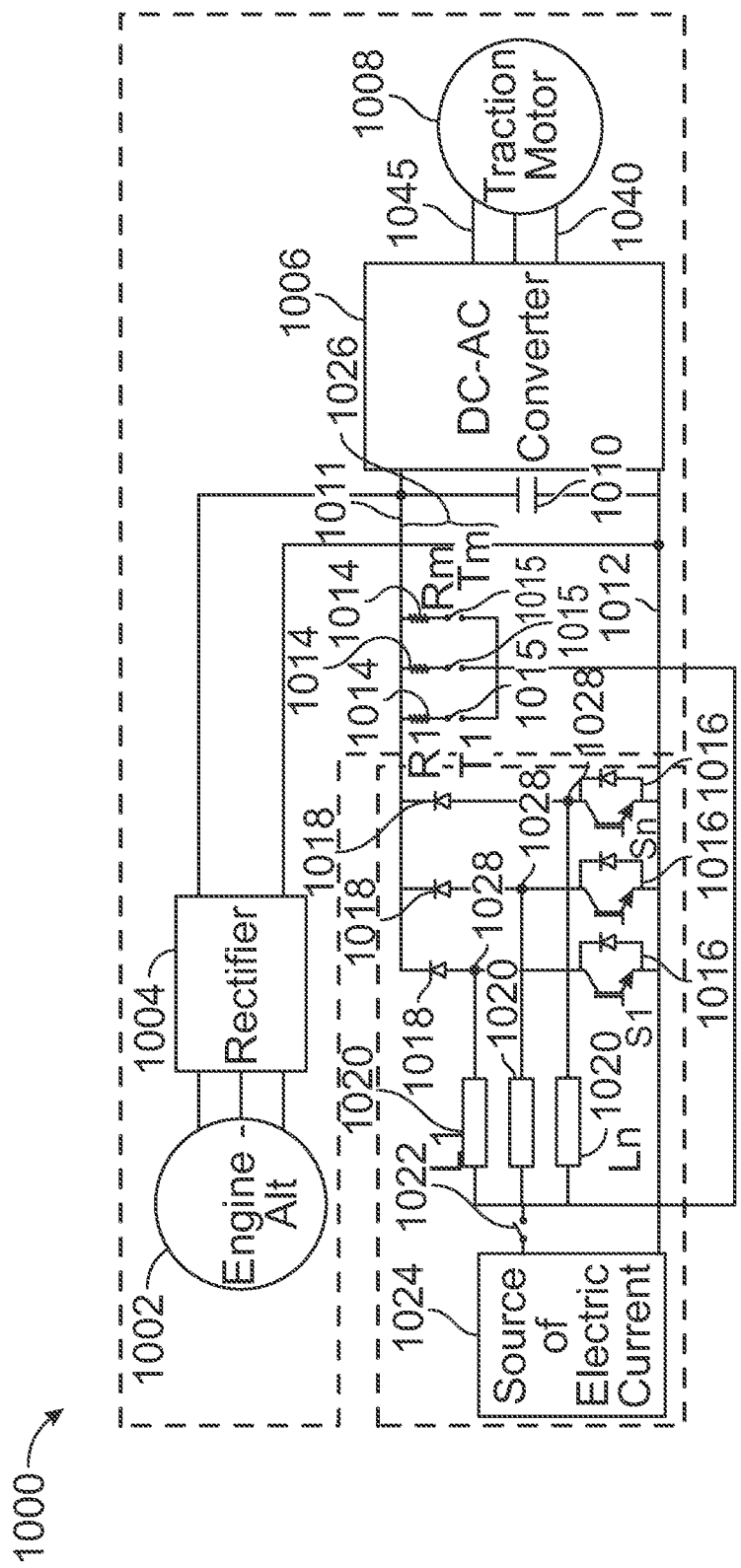
FIG. 10 illustrates a schematic view of a drive system in an engine propulsion mode of operation.

FIG. 10 illustrates operation of an embodiment of a drive system. The drive system may operate in an engine propulsion mode, a boost propulsion mode, or a dynamic braking mode. Included in the illustrated schematic are two sources of electric current, an on-board source and an off-board source. Alternatively, the drive system may have another on-board source, such as a battery instead of an off-board source. The off-board source of electric current 1024 can be a power source, such as an electrified rail or a catenary. The on-board source can be an engine-alternator set 1002 an energy storage device or battery. The off-board source of electric current can be connected to a positive bus 1011 and a negative bus 1012. The positive bus connects the source of electric current with a switch 1022. The positive bus connects the source of electric current with a circuit leg connected in series to plural other circuit legs 1026 connected in series with each other. In each of the plural circuit legs, the contactor 1015 and the braking resistor 1014 are connected in series with each other. The positive bus connects plural inductors 1020, the plural inductors connected in parallel with each other. The switch is located between the source of electric current and the plural inductors. Each inductor of the plural inductors is connected to a collector of a semiconductor switch 1016 of plural semiconductor switches and the anode of a diode 1018 of plural diodes. The cathodes of the plural diodes are connected in parallel with the circuit legs that include plural contactor switches and plural braking resistors. Corresponding nodes 1028 are disposed between the plural contactor switches and the plural semiconductor switches. The plural circuit legs are connected in parallel with the plural diodes. The cathodes of the plural diodes and the plural circuit legs having braking resistors and contactors can be coupled with a direct current to alternating current (DC-AC) converter 1006 by the positive bus. The DC-AC converter can be connected to a motor 1008 by another positive bus and another negative bus. The capacitor 1010 can be connected in parallel with the plural diodes, and the DC-AC converter. The off-board source of electric current can be connected with the emitters of the plural semiconductor switches by the negative bus. The negative bus can be connected with the capacitor and with the DC-AC converter. A rectifier 1004 can be connected with the DC-AC converter by another positive bus 1045 and another negative bus 1040. In the illustrated embodiment, the motor is a traction motor.

In an engine propulsion mode of operation, the engine-alternator set generates power to the rectifier to provide power for the motor. Contactors are open, so the current is conducted from the engine-alternator set to the motor. The engine-alternator set can be powered by fuel, such as diesel. The engine-alternator set can provide AC for auxiliary electrical requirements, such as lighting. The rectifier can convert the AC voltage from the engine-alternator set to DC, providing current for charging the capacitor. The current is conducted to the DC-AC converter. The DC-AC converter can convert incoming DC to AC to provide current for the motor.

Alternatively, the drive system may operate in a boost propulsion mode. In boost mode, the contactor switch disposed between the source of electric current and the plural inductors is closed, allowing current to be conducted from the source of electric current along the positive bus. The plural contactors are open. The source of electric current generates power to the plural inductors disposed in the circuit legs, where the energy may be stored. The source of electric current can be an off-board power source, such as an electrified rail or a catenary or an on-board source of electric current, such as an energy storage device or battery. The current can be conducted through the plural diodes to provide power for the motor. Connected to the source of electric current via the negative bus, the capacitor can be charged, and the motor may receive current.

Alternatively, the drive system may operate in a dynamic braking mode. The dynamic braking mode may be a regenerative braking mode, a rheostatic braking mode, or a combination of both modes. In regenerative braking mode, rheostatic braking mode, or a combination of both modes, the contactor switch disposed between the source of electric current and the plural inductors is open and does not allow current to be conducted from the off-board source of electric current. However, at least one of plural contactor switches disposed in the circuit legs is closed and does allow current to be conducted through the braking resistor, corresponding plural inductors and corresponding plural semiconductor switches from the motor. The regenerated energy from the motor is conducted to the braking resistor and dissipated as heat. The plural semiconductor switches can modulate open and close in a rapid manner. The fast pulsing of the semiconductor switch will allow braking to be a smooth and controlled retard. For example, with the contactor disposed in the circuit legs closed, the pulsing or opening and closing of the semiconductor switch can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor Alternatively semiconductor switches can be switched ON & OFF simultaneously. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. Current is conducted from the plural semiconductor switches along the negative bus of the drive system 1000 to the capacitor, the DC-AC Converter, and on to the motor. In this embodiment, the capacitor is discharged, and the motor provides the voltage in this embodiment.

Figure 11:
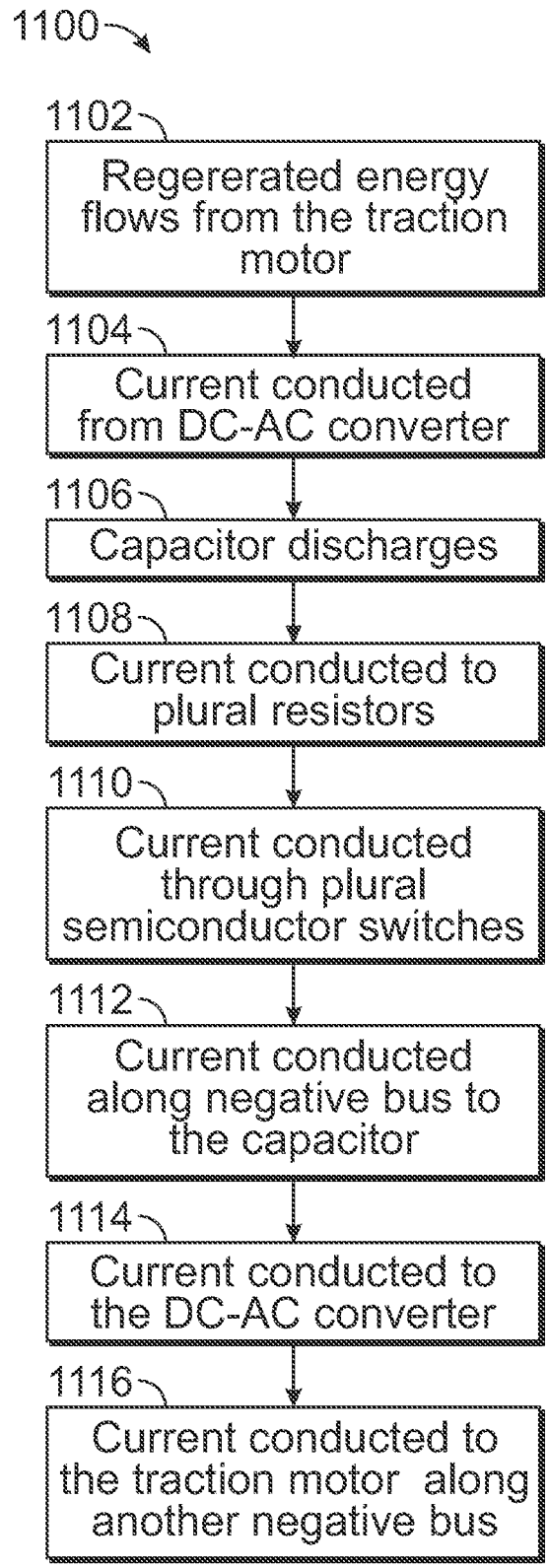
FIG. 11 illustrates an example of a method of dynamic braking in a drive system.

FIG. 11 provides an example of a method of regenerative braking, rheostatic braking, or a combination of both in the drive system illustrated in FIG. 8. At 1102, regenerated energy is conducted from a motor. For example, the motor may act as a power source for the drive system. The motor may operate like a generator providing energy previously supplied by other power sources, such as batteries. The current from the motor is conducted from the motor to the DC-AC converter. The current may be an alternating current (AC). The current may be conducted to the DC-AC converter along a positive bus located between the motor and the DC-AC converter. The DC-AC converter may convert the alternating current to direct current (DC).

At 1104 the current is conducted from the DC-AC converter along another positive bus to capacitor. For example, the current may be conducted between the DC-AC converter and the capacitor along a different positive bus than the bus that is disposed between the motor and the DC-AC converter. Alternatively, the current may be conducted from the DC-AC converter along the same bus that is located between the motor and the DC-AC converter.

At 1106 the capacitor discharges. For example, in braking regenerative mode, rheostatic braking mode, or a combination of both modes, the energy stored by the capacitor may drain along the positive bus. The current may continue to be conducted toward the plural braking resistors.

At 1108 the current is conducted to plural braking resistors and dissipated as heat due to a closed contactor. For example, at least one of plural contactor switches is closed and allows current to be conducted through corresponding plural braking resistors along the positive bus. The current may not be allowed to be conducted along the positive bus to the diodes due to the forward bias nature of the diodes. In this embodiment, the diodes may be oriented to restrict current flow in a particular circuit leg. Alternatively, another semiconductor switch, such as an IGBT, may be used that operates and allows current to be conducted bidirectionally through the component.

At 1110 the current is conducted through plural semiconductor switches. For example, the pulsing or opening and closing of the semiconductor switches can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened. and with fewer moving parts, the complexity of manufacturing and expense is reduced. is conducted. Other power sources may be bypassed due to closed contactors while in regenerative braking mode. Accordingly, the current is conducted along the negative bus of the drive system toward the capacitor.

At 1112 current is conducted to the capacitor. For example, the current is conducted along the negative bus. The negative bus is connected to the end of the capacitor not connected to the positive bus. The current is conducted along the negative bus through the capacitor connection to the DC-AC converter.

At 1114 current is conducted to the DC-AC converter along the negative bus. For example, the negative terminal of the DC-AC converter is connected to the negative bus. The DC-AC converter can convert DC to AC as needed by the motor during the regenerative braking mode, rheostatic braking mode, or a combination of both modes. The current is conducted from the DC-AC converter toward the motor.

At 1116 current is conducted to the motor. For example, the current may be conducted from the DC-AC converter along another negative bus. Alternatively, the current may be conducted along the same negative bus that is connected to the other circuit components. For regenerative braking mode, the motor provides power to the drive system. The system may operate in this mode as required to produce controlled braking and a smooth retard.

Figure 12:
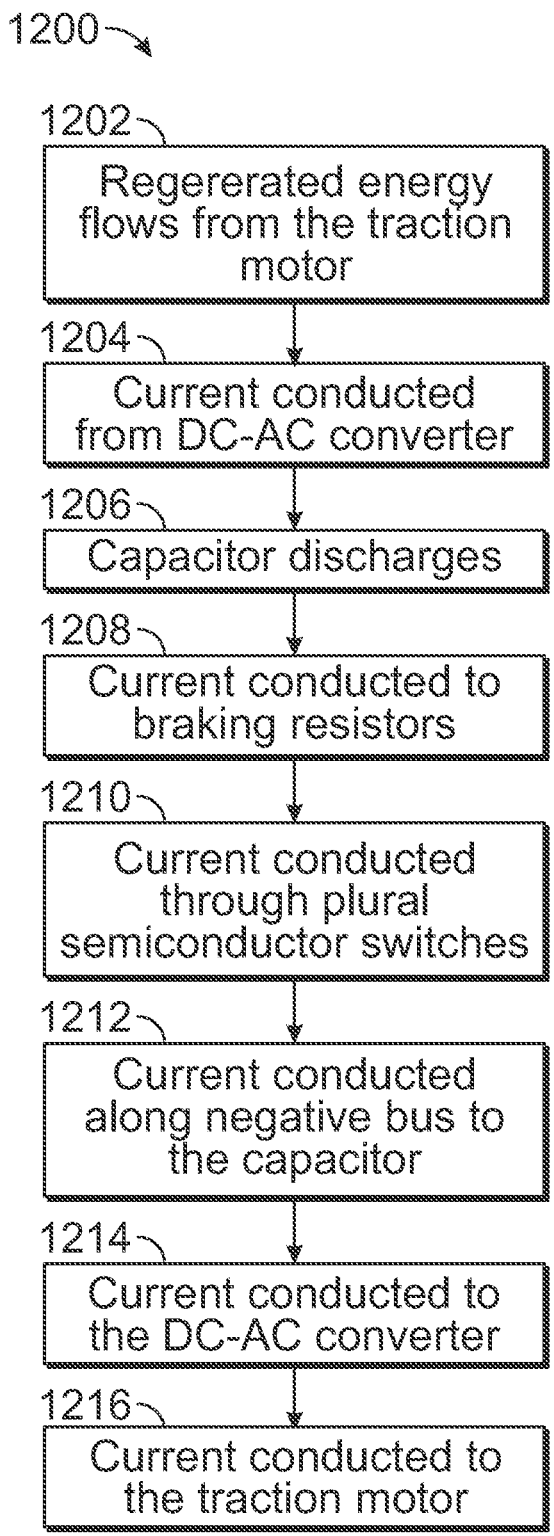
FIG. 12 illustrates an example of a method of dynamic braking in a drive system.

FIG. 12 provides an example of a method of regenerative braking, rheostatic braking, or a combination of both in the drive system illustrated in FIG. 9. At 1202, regenerated energy is conducted from a motor. For example, the motor may act as a power source for the drive system. The motor may operate like a generator providing energy previously supplied by other power sources, such as batteries. The current from the motor is conducted from the motor to the DC-AC converter. The current may be an alternating current (AC). The current may be conducted to the DC-AC converter along a positive bus located between the motor and the DC-AC converter. The DC-AC converter may convert the current to direct current (DC).

At 1204 the current is conducted from DC-AC converter along another positive bus to the capacitor. For example, the current may be conducted between the DC-AC converter and the capacitor along a different positive bus than the bus that is disposed between the motor and the DC-AC converter. Alternatively, the current may be conducted from the DC-AC converter along the same bus that is located between the motor and the DC-AC converter.

At 1206 the capacitor discharges. For example, in braking regenerative mode, rheostatic braking mode, or a combination of both modes, the energy stored by the capacitor may drain along the positive bus. The current may continue to be conducted toward a braking resistor.

At 1208 the current is conducted to the braking resistor and dissipated as heat due to a closed contactor. For example, the braking resistor may be connected in series to plural contactors connected in parallel to each other. At least one of plural contactors is closed and allows current to be conducted through the braking resistor along the positive bus. The current may not be allowed to be conducted along the positive bus to the diodes due to the forward bias nature of the diodes. In this embodiment, the diodes may be oriented to restrict current flow in a particular circuit leg. Alternatively, another type of semiconductor switch, such as an IGBT, may be used that operates and allows current to be conducted bidirectionally through the component.

At 1210 the current is conducted through plural semiconductor switches. For example, the pulsing or opening and closing of the semiconductor switches can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. Other power sources may be bypassed due to closed contactors while in regenerative braking mode, rheostatic braking mode, or a combination of both modes. Accordingly, the current is conducted along the negative bus of the drive system toward the capacitor.

At 1212 current is conducted to the capacitor. For example, the current is conducted along the negative bus.

The negative bus is connected to the end of the capacitor not connected to the positive bus. The current is conducted along the negative bus through the capacitor connection to the DC-AC converter.

At 1214 current is conducted to the DC-AC converter along the negative bus. For example, the negative terminal of the DC-AC converter is connected to the negative bus. The DC-AC converter can convert DC to AC as needed by the motor during the regenerative braking mode, rheostatic braking mode, or a combination of both modes. The current is conducted from the DC-AC converter toward the motor.

At 1216 current is conducted to the motor. For example, the current may be conducted from the DC-AC converter along another negative bus. Alternatively, the current may be conducted along the same negative bus that is connected to the other circuit components. For regenerative braking mode, rheostatic braking mode, or a combination of both modes, the motor provides power to the drive system. The system may operate in this mode as required to produce controlled braking and a smooth retard.

Figure 13:
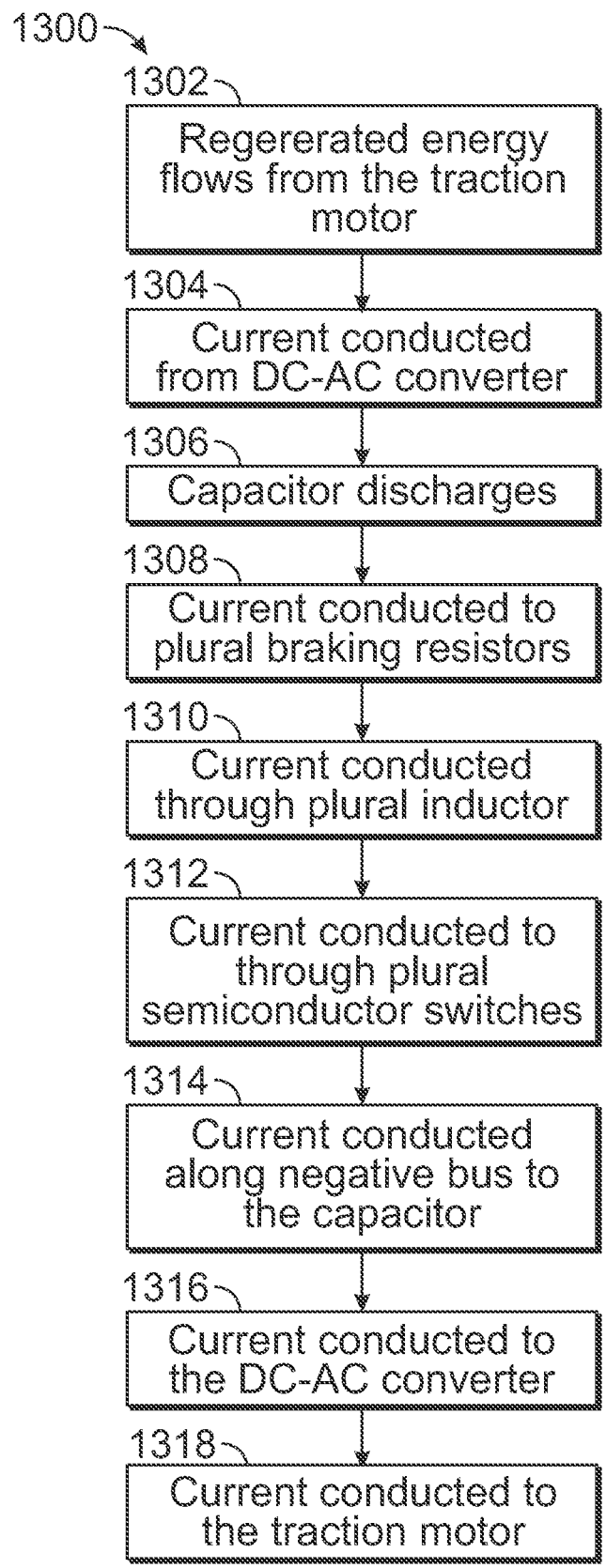
FIG. 13 illustrates an example of a method of dynamic braking in a drive system.

FIG. 13 provides an example of a method of regenerative braking, rheostatic braking, or a combination of both in the drive system illustrated in FIG. 9. At, regenerated energy is conducted from a motor. For example, the motor may act as a power source for the drive system. The motor may operate like a generator providing energy previously supplied by other power sources, such as batteries. The current from the motor is conducted from the motor to the DC-AC converter. The current may be an alternating current (AC). The current may be conducted to the DC-AC converter along a positive bus located between the motor and the DC-AC converter. The DC-AC converter may convert the current to direct current (DC).

At 1304 the current is conducted from DC-AC converter along another positive bus to capacitor. For example, the current may be conducted between the DC-AC converter and the capacitor along a different positive bus than the bus that is disposed between the motor and the DC-AC converter. Alternatively, the current may be conducted from the DC-AC converter along the same bus that is located between the motor and the DC-AC converter.

At 1306 the capacitor discharges. For example, in braking regenerative mode, rheostatic braking mode, or a combination of both modes, the energy stored by the capacitor may drain along the positive bus. The current may continue to be conducted toward plural braking resistors.

At 1308 the current is conducted to the plural braking resistors and dissipated as heat due to a closed contactor. For example, the plural braking resistors may be connected in series to plural contactors connected in parallel to each other. At least one of plural contactors is closed and allows current to be conducted through the braking resistor along the positive bus. The current may not be allowed to be conducted along the positive bus to the diodes due to the forward bias nature of the diodes. In this embodiment, the diodes may be oriented to restrict current flow in a particular circuit leg. Alternatively, another type of semiconductor, such as an IGBT, may be used that operates and allows current to be conducted bidirectionally through the component. The current is conducted through the plural resistive circuit legs connected to each other in parallel to plural inductors.

At 1310 the current is conducted through plural inductors. For example, the plural inductors may be connected in parallel to each other and connected in series to the plural resistive legs. The stored energy in the plural inductors may discharge in regenerative braking mode, rheostatic braking mode, or a combination of both modes. The current may conduct along the positive bus from the plural inductors to plural semiconductor switches.

At 1312 the current is conducted through the plural semiconductor switches. For example, the pulsing or opening and closing of the semiconductor switches can allow smaller more discrete amounts of current through the braking resistor. If the current is too much for one semiconductor switch to handle, another semiconductor switch may be configured to handle at least some of the current. For example, one semiconductor switch may handle the current one-third of the time while another semiconductor switch handles the current another third of the time and another semiconductor handles the current during the remaining third of the time. This hand off of switching activity can provide continuous control over braking of the powered system. The duty cycles of each of the semiconductor switches handle how long the current is allowed to pass through the braking resistor. Longer duty cycles represent a longer time that the semiconductor switch is closed and handling the current. Using the semiconductor switches in conjunction with the braking resistors and the contactor switches, arcing, wear, and tear on the discrete components are lessened, and with fewer moving parts, the complexity of manufacturing and expense is reduced. Other power sources may be bypassed due to closed contactors while in regenerative braking mode, rheostatic braking mode, or a combination of both modes. Accordingly, the current is conducted along the negative bus of the drive system toward the capacitor.

At 1314 current is conducted to the capacitor. The current is conducted along the negative bus. For example, the negative bus is connected to the end of the capacitor not connected to the positive bus. The current is conducted along the negative bus through the capacitor connection to the DC-AC converter.

At 1316 current is conducted to the DC-AC converter along the negative bus. For example, the negative terminal of the DC-AC converter is connected to the negative bus. The DC-AC converter can convert DC to AC as needed by the motor during the regenerative braking mode, rheostatic braking mode, or a combination of both modes. The current is conducted from the DC-AC converter toward the motor.

At 1318 current is conducted to the motor. For example, the current may be conducted from the DC-AC converter along another negative bus. Alternatively, the current may be conducted along the same negative bus that is connected to the other circuit components. For regenerative braking mode, rheostatic braking mode, or a combination of both modes, the motor provides power to the drive system. The system may operate in this mode as required to produce controlled braking and a smooth retard.

In one or more embodiments, a system is provided that can include resistive circuit legs coupled with and disposed between (a) a converter that converts electric current for a motor and (b) a source of electric current for powering the motor. Each of the circuit legs can include a braking resistor coupled with the converter. Each of the circuit legs can include a contactor coupled with the braking resistor such that the braking resistor is between the converter and the contactor and a first semiconductor switch coupled with the contactor such that the contactor is between the first semiconductor switch and the braking resistor. During a regenerative braking mode, rheostatic braking mode, or a combination of both the regenerative braking mode and the rheostatic braking mode, the regenerated electric current from the motor can be conducted to the braking resistor and dissipated as heat.

Optionally, each of the contactors can be configured to be individually controlled to alternate between (a) an open state where the corresponding braking resistor coupled with the contactor is disconnected from the corresponding node and (b) a closed state where the braking resistor corresponding to and coupled with the contactor is connected with the corresponding node of the contactor.

Optionally, each of the braking resistors can be configured to dissipate at least part of the regenerated electric current from the motor as heat while the corresponding contactor is in the closed state. Optionally, each of the braking resistors can be configured to dissipate at least part of the regenerated electric current from the motor as heat while the corresponding first semiconductor switch is in the closed state. Optionally, each of the contactors can be configured to cause at least part of the regenerated current from the motor to be conducted through a capacitor while the contactor is in the open state. Optionally, (a) one or more diodes or (b) second semiconductor switch can be connected in parallel with each other and with the contactors and the braking resistors between the source of electric current and the converter. Optionally, the source of electric current can be one or more of an electrified rail or a catenary or energy storage device. Optionally, (a) one or more inductors, (b) one or more diodes or second semiconductor switch, (c) the contactors, and (d) the braking resistors can be connected with the converter in parallel to an alternator and a rectifier.

In another aspect, a system is provided that can include a braking resistor coupled with a converter that converts electric current for a motor of a powered system and several circuit legs coupled with the braking resistor in parallel to each other. Each of the circuit legs can include a contactor and a first semiconductor switch coupled with the contactor such that the contactor is between the first semiconductor switch and the braking resistor. During a regenerative or rheostatic braking mode of operation of the powered system, the regenerated energy from the motor of a powered system can be conducted to the braking resistor and dissipated as heat, based on which of (a) the contactor or (b) the first semiconductor switch is closed.

Optionally, the contactors can be connected in parallel to each other between the off-board source of electric current and the braking resistor. Optionally, one or more inductors can be connected in parallel with each other and with the contactors and the braking resistors between source of electric current and the converter. Optionally, (a) one or more diodes or (b) a second semiconductor switch are connected in parallel with each other and with the contactors and the braking resistors between the off-board source of electric current and the converter. Optionally, the source of electric current can be one or more of an electrified rail or a catenary or energy storage device. Optionally, (a) the inductors, (b) one or more diodes or one or more second semiconductor switches, (c) the contactors, and (d) the braking resistors are connected with the converter in parallel to an alternator and a rectifier. Optionally, a capacitor can be connected with the converter in parallel to an alternator and a rectifier.

In one or more embodiments, a system is provided that can include two or more inductors, one or more first semiconductor switches, and one or more second semiconductor switches. Each of the inductors can be disposed onboard a powered system and selectively coupled with an off-board power source and a converter that converts electric current for a motor of a powered system. Additionally, each of the inductors can be coupled with a node located between a cathode of a first semiconductor switch of the one or more first semiconductor switches and (a) an anode of a diode or (b) an emitter of a second semiconductor switch of the one or more second semiconductor switches. Each of the anode and emitter can be coupled with a converter, contactors connected in parallel with each other between the source of electric current and the converter. Further, the anode or emitter can be coupled with braking resistors connected in parallel with each other, each of the braking resistors connected in series with a different contactor between the contactor and the converter. Furthermore, each of the anodes can be coupled with a first semiconductor switch coupled with the contactor such that the contactor is between the first semiconductor switch and the braking resistors. During a regenerative or rheostatic braking mode of the powered system, the regenerated energy from the motor can be conducted to the braking resistor and dissipated as heat, based on which contactors or first semiconductor switches are closed.

Optionally, the two or more inductors and (a) the diodes or (b) the second semiconductor switch can be connected in parallel to the contactors and the braking resistors between the source of electric current and the converter. Optionally, the source of electric current can be one or more of an electrified rail or a catenary or energy storage device. Optionally, (a) the two or more inductors, (b) the diodes or the second semiconductor switch, (c) the contactors, and (d) the braking resistors can be connected with the converter in parallel to an alternator and a rectifier. Optionally, a capacitor can be connected with the converter in parallel to an alternator and a rectifier.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
at least one resistive circuit leg coupled with and disposed between (a) a converter that converts first electric current for a motor and (b) a source of the first electric current for powering the motor, the at least one resistive circuit leg including:
a braking resistor, and
a contactor coupled with the braking resistor;
a first semiconductor switch coupled with and disposed parallel to the at least one resistive circuit leg; and
a second semiconductor switch coupled with the first semiconductor switch and the at least one resistive circuit leg with the at least one resistive circuit leg connected with the first semiconductor switch and the second semiconductor switch in a location that is between the first semiconductor switch and the second semiconductor switch,
wherein, during a regenerative braking mode, a rheostatic braking mode, or a combination of both the regenerative braking mode and the rheostatic braking mode, the contactor is closed and the first semiconductor switch is controlled to alternate between an open state and a closed state to conduct at least some of a regenerated electric current from the motor to the braking resistor to control braking by the motor.

2. The system of claim 1, wherein the second semiconductor switch is configured to close while the contactor closes and the first semiconductor switch is individually controlled to alternate between the open state and the closed state during the regenerative braking mode, the rheostatic braking mode, or the combination of both the regenerative braking mode and the rheostatic braking mode.

3. The system of claim 2, wherein the first semiconductor switch is configured to cause at least part of the regenerated electric current from the motor to be conducted through a capacitor while the first semiconductor switch is in the open state, the capacitor disposed between (a) a circuit leg having the first semiconductor switch and the second semiconductor switch connected in series with each other and fb) the converter with the capacitor disposed in and parallel to the at least one resistive circuit leg and between the circuit leg having the first semiconductor switch and the second semiconductor switch and the converter.

4. The system of claim 1, wherein the braking resistor is configured to dissipate at least part of the regenerated electric current from the motor as heat.

5. The system of claim 1, wherein the first source of the first electric current is one or more of an electrified rail, a catenary, or an energy storage device.

6. A system comprising:
a positive bus configured to be connected with a source of electric current;
a negative bus configured to be connected with the source of the electric current, the positive bus and the negative bus connected with a converter that converts the electric current for a motor of a powered system;
a braking resistor coupled with the positive bus;
several parallel circuit legs coupled in series with the braking resistor, each of the circuit legs including a contactor; and
several semiconductor switches connected in parallel to each other with each of the semiconductor switches connected in series with a different circuit leg of the several parallel circuit legs between the positive bus and the negative bus,
wherein, during a regenerative braking mode or a rheostatic braking mode of the powered system, regenerated electric current from the motor is conducted to the braking resistor and dissipated as heat with different ones of the semiconductor switches closing at different times while others of the semiconductor switches remain open.

7. The system of claim 6, further comprising inductors connected in parallel to each other between the source of the electric current and the circuit legs, each of the inductors connected with a different one of the circuit legs.

8. The system of claim 6, wherein the source of the electric current is one or more of an electrified rail, a catenary, or an energy storage device.

9. The system of claim 6, wherein a capacitor is connected to the positive bus and the negative bus in parallel to the converter and the circuit legs.

10. A system comprising:
one or more first semiconductor switches;
one or more second semiconductor switches;
two or more inductors, with each inductor of the two or more inductors configured to be disposed onboard a powered system and selectively coupled with a source of first electric current and a converter that converts the first electric current for a motor of the powered system, the two or more inductors each coupled with nodes located between the one or more first semiconductor switches and (a) one or more diodes or (b) the one or more second semiconductor switches, second semiconductor switches coupled with a converter;
contactors connected in parallel with each other between the source of the first electric current and the converter; and
braking resistors connected in parallel with each other, each of the braking resistors connected in series with a different contactor of the contactors between the contactor and the converter;
wherein, the first semiconductor switch of the one or more first semiconductor switches is coupled with a contactor of the contactors connected in parallel with each other, such that the contactor of the contactors connected in parallel with each other is between the first semiconductor switch of the one or more first semiconductor switches and the braking resistors,
wherein, during a regenerative or rheostatic braking mode of operation of the powered system, regenerated electric current from the motor of the powered system is conducted to the braking resistors and dissipated as heat, based on which of the contactors or the one or more first semiconductor switches are closed.

11. The system of claim 10, wherein the two or more inductors and (a) the diode or (b) the second semiconductor switch are connected in parallel to the contactors and the braking resistors between the source of the first electric current and the converter.

12. The system of claim 10, wherein the source of the first electric current is one or more of an electrified rail, a catenary, or energy storage device.

13. The system of claim 10, wherein (a) the two or more inductors, (b) the diode or the second semiconductor switch, (c) the contactors, and (d) the braking resistors are connected with the converter in parallel to an alternator and a rectifier.

14. The system of claim 10, wherein a capacitor is connected with the converter in parallel to an alternator and a rectifier.

* * * * *